United States Patent [19]
Bedo et al.

[11] 3,799,194
[45] Mar. 26, 1974

[54] BALL CHECK VALVE

[76] Inventors: Alfred Bedo, 7225 Spanghurst Dr., Walton Hills, Ohio; Edward Beck, 1584 S. Taylor Rd., Cleveland Heights, Ohio 44118

[22] Filed: Dec. 20, 1972

[21] Appl. No.: 316,961

Related U.S. Application Data

[63] Continuation of Ser. No. 243,498, April 12, 1972, abandoned.

[52] U.S. Cl. .............................................. 137/539.5
[51] Int. Cl. .............................................. F16k 15/04
[58] Field of Search............ 137/515, 515.7, 533.15, 137/539, 539.5

[56] References Cited
UNITED STATES PATENTS
3,559,678   2/1971   Donner ..................... 137/539.5 X
3,095,900   7/1963   Newhall ..................... 137/515.7 X FOREIGN PATENTS OR APPLICATIONS
194,494   6/1967   U.S.S.R. ........................... 137/539.5

*Primary Examiner*—Robert G. Nilson
*Attorney, Agent, or Firm*—Fay, Shappe and Mulholland

[57] ABSTRACT

A ball check valve for high pressure applications, and including axially bored telescoping and threadedly engaged body portions which define a through flow path and an internal valve chamber. An annular ball seat component is positioned between and sealingly engaged by opposed inner ends of the body portions. Carried within the internal valve chamber is a ball retainer which has a first end facing the seat and a reduced diameter portion which extends downstream in the bore. The retainer is continuously biased toward the seat by a spring that surrounds the reduced diameter portion and bears against a shoulder in the bore. A ball is positioned between the first end of the retainer and the seat. The retainer has a conical, axially extending recess in its first end which engages the ball with line contact. Additionally, longitudinal grooves are formed in the retainer to allow flow along the retainer when the ball is forced away from the seat. Also, the reduced diameter end portion of the retainer is hollow and axially cut out to define circumferentially spaced legs between which fluid can flow.

1 Claim, 4 Drawing Figures

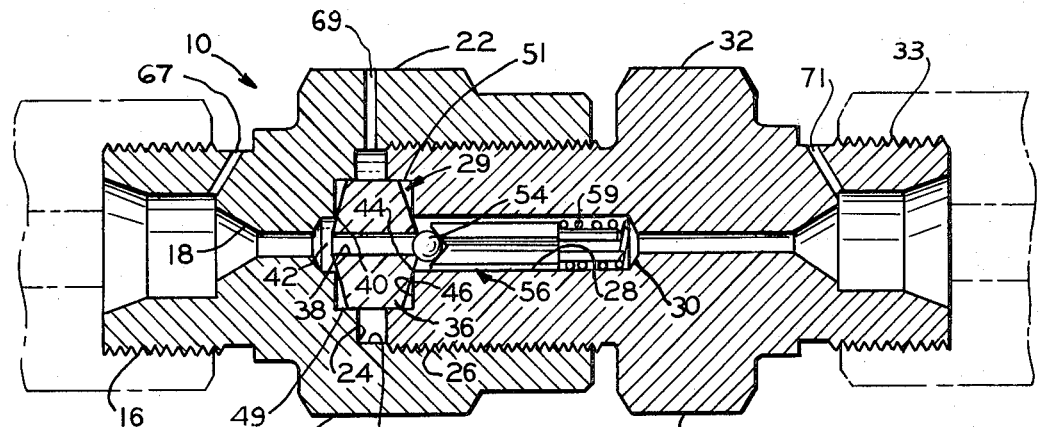
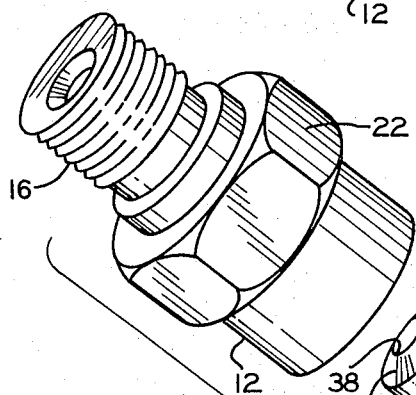
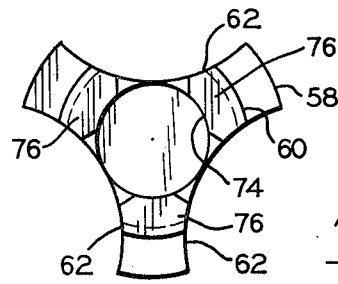
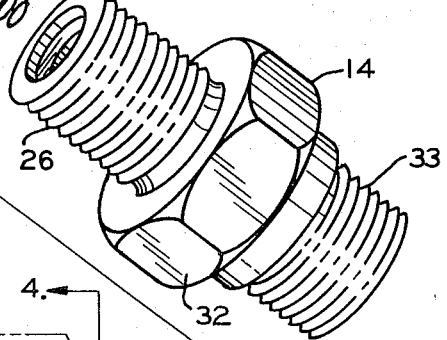
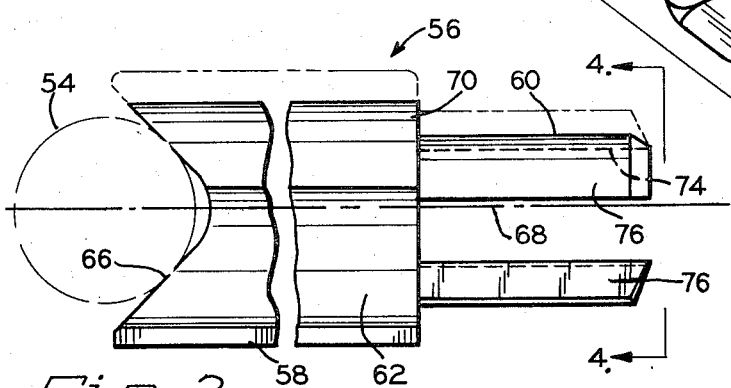
INVENTORS.
ALFRED BEDO
EDWARD BECK
BY
Fay, Sharpe & Mulholland
ATTORNEYS.

BALL CHECK VALVE

This is a continuation of application Ser. No. 243,498, filed Apr. 12, 1972, now abandoned.

The subject invention is directed toward the valve art and, more particularly, to an improved ball type check valve especially adapted for use in connection with the high pressure applications.

The invention is especially suited for use in small check valves of the type used in instrumentation lines and the like, and will be described with particular reference thereto; however, it will be appreciated the invention is capable of broader application and could be embodied in check valves of many sizes.

Check valves for use in control or instrumentation lines must be particularly sensitive and provide rapid shut-off under reverse flow conditions. Because of the generally small size of the lines used in instrumentation, the valves themselves must be relatively small. The small size of the valves increases the difficulty of making them sensitive. The problem is further increased by the requirement that the pressure drop through the valve in the normal flow direction be relatively small.

The subject invention provides a ball-type check valve which meets the above-mentioned requirements and allows check valves of small sizes to have a high degree of sensitivity.

Generally, check valves formed according to the invention comprises axially bored telescoping and threadedly engaged body portions which define a through flow path and an internal valve chamber. An annular ball seat component is positioned between and sealingly engaged by opposed inner ends of the body portions. Carried within the internal valve chamber is a ball retainer which has a first end facing the seat and a reduced diameter portion which extends downstream in the bore. The retainer is continuously biased toward the seat by a spring that surrounds the reduced diameter portion and bears against a shoulder in the bore. A ball is positioned between the first end of the retainer and the seat. The retainer has a conical, axially extending recess in its first end which engages the ball with line contact. Additionally, longitudinal grooves are formed in the retainer to allow flow along the retainer when the ball is forced away from the seat. Also, the reduced diameter end portion of the retainer is hollow and axially cut out to define circumferentially spaced legs between which fluid can flow.

As can be appreciated, the arrangement of the ball and the retainer is such that the full downstream surface of the ball is exposed to the line pressure. This makes the valve more sensitive and gives it a more positive action. Further, the flow path about the retainer is such as to produce a comparatively low pressure drop when considered relative to prior ball check valves.

An additional advantage of the arrangement is the ease with which access can be had to the interior of the valve for replacement of the seat ball, retainer or spring. Further, the manner in which the seat member is engaged by the body halves eliminates the need for separate seal elements between the body halves.

The primary object of the invention is the provision of a ball check valve in which the ball and the ball retainer or guide are related in a manner to permit the entire upstream side of the ball to be exposed to line pressure.

Another object is the provision of a ball check valve which produces a relatively small pressure drop in the normal direction of fluid flow.

A further object of the invention is the provision of a ball check valve that is particularly suited for manufacture in small sizes for use in instrumentation controls and the like.

A still further object is the provision of a ball type check valve which has the ball seat formed as a separate ring member sealingly engaged on opposite side by separable valve body halves.

The above and other objects and advantages will become apparent from the following description when read in conjunction with the accompanying drawings wherein:

FIG. 1 is a longitudinal cross-section through a preferred embodiment of the invention;

FIG. 2 is an exploded pictorial view of the valve shown in FIG. 1;

FIG. 3 is an enlarged view of the ball retainer member and showing its relationship to the ball;

FIG. 4 is an end view of the ball retainer taken on line 4—4 of FIG. 3.

As best shown in FIG. 1, the preferred embodiment of the check valve includes a housing 10 which is formed from two separable body portions 12 and 14. Preferably, the body portions 12 and 14 are each machined from solid pieces of stock such as brass, stainless steel or the like; however, it would be possible to form the body by other techniques.

As can be seen, body portion 12 has a first, threaded end portion 16 which, in the embodiment under consideration, is arranged to receive a conventional tube fitting. Other types of end fittings could equally well be used, such as flanges or the like.

An axial flow passage 18 extends inwardly from end portion 16 to an enlarged bore 20 formed inwardly from the opposite end of body portion 12. The exterior of portion 12 is preferably provided with wrench receiving flats or tool pads 22 to facilitate assembly and disassembly of the valve. The inner surface of the enlarged bore 20 is provided with threads which extend inwardly from the outer end of bore 30 to a position closely adjacent the inner wall 24.

Body portion 14 is arranged to be matingly received within portion 12 and includes a threaded end portion 26 adapted to be received within the bore 20. A center bore 28 extends axially through the body portion 14 and in combination with bore 20 defined an internal valve chamber 29. It will be noted that a left-hand end of bore 28 (as viewed in FIG. 1) is of a substantially larger diameter than the right-hand end portion to provide an inner shoulder 30. The outlet end 33 of body portion 14 is, like body portion 12, threaded and arranged to receive a standard tube fitting. The enlarged center section of body portion 14 is provided with wrench flats or tool pads 32 so that the two body portions can be easily assembled and disassembled.

Although the body has been described as formed of only two elements, it is to be understood that, the body could have other arrangements and be formed from three or more separate elements. Additionally, although the body portions have been shown as arranged for connection to standard tube fittings other types of end connections could be provided, for example, flange or weld fittings.

Of particular importance to the invention is the arrangement of the internal ball valve member and its seat and retainer. As shown in FIGS. 1 and 2, the valve seat is defined by a generally annular member 36 which has an axial center opening 38. Depending upon the service requirement, the member 36 could be formed from a variety of different materials. In the embodiment under consideration, it is formed from stainless steel. It will be noted that the member is positioned between the mating body portions 12 and 14 and rests against the corner 40 at the juncture between the inner end 24 of the bore 20 and the enlarged diameter portion 42 of bore 18. The opposite face of member 36 is engaged by corner 44 of bore 28 and the enlarged inner bore 46 of body portion 14. The line contact between the respective corners 40, 44 and the member 36 provide a metal-to-metal line contact seal between the mating body portions 12 and 14. Additionally, it will be seen that recesses 49 and 51 are formed in the body portions to receive and center the member 36 relative to the bore. Note that no other seals are required.

Positioned within the enlarged diameter portion 28 is the ball valve member 54. It is to be understood that although a ball is preferred, other types of valve members could be utilized. For example, a bullet shaped member could be used. In the embodiment shown, the ball has a diameter substantially larger than the diameter of the bore 38 and engages the opening 38 with line contact. The ball is guided and biased toward the member 36 by a retainer 56 which is continuously biased toward the ball and seat by a coil spring 59. The strength of spring 59 depends, of course, on the pressure requirements.

The arrangement of the retainer 56 is relatively important to the invention and is preferably formed as best shown in FIGS. 3 and 4. In particular, the retainer member 56 comprises an elongated somewhat cylindrical body member having an enlarged diameter end portion 58 and a somewhat reduced diameter portion 60.

Portion 58 is of a diameter such that it is closely but slidably received in the enlarged diameter portion of bore 28 of body portion 14. Extending axially of portion 56 are three arcuate grooves 62. As can be seen in FIG. 4, the grooves 62 extend the entire length of the retainer and are formed into the reduced diameter portions 60. It should be appreciated that the grooves provide a flow passage about the retainer to permit free flow of fluid through the bore 28 when the ball 54 is moved away from the seat member 36 under the influence of line pressure. Additionally, the grooves 62 cooperate with the ball engaging end of the retainer to permit upstream line pressure to engage virtually the entire ball 54.

As shown, the ball engaging end portion of retainer 56 comprises a generally conically shaped recess 66 formed inwardly from the end of portion 58. The recess 66 is aligned with the longitudinal axis 68 of the retainer. As best shown in FIG. 3, the recess 66 is arranged so that the ball is contacted by the retainer only along three relatively short arcuate lines. (See the dotted lines in FIG. 4). The importance of this relationship is that it permits virtually the entire downstream face of the ball to be exposed to line pressure. Thus, the sensitivity of the valve to reverse flow is substantially enhanced. This is particularly important, especially when the valve is made in relatively small sizes.

It will be noted that small diameter bleed openings 67, 69, and 71 are formed through the body portions. The bleed openings are positioned so that if any leakage occurs about the fittings or the annular seat member, an external indication is given.

Also, somewhat important to the invention is the relationship between spring 59 and retainer 56. As shown, the spring 59 extends between the shoulder 30 in bore 28, and the shoulder 70 located between the reduced diameter portion 60 and the enlarged diameter portion 58 of the retainer 56. It is important to note that the length of the reduced diameter portion of the retainer is greater than the fully compressed length of the spring 59. This assures that the spring can never fully compress and shut off the flow through the bore 28. Additionally, to assure a flow path and to minimize flow reduction caused by the reduced diameter portion 60, an opening or bore 74 is formed axially inward of the retainer from the free end of the reduced diameter end portion 60. As best shown in FIG. 3, the bore 74 preferably extends substantially the entire length of the reduced diameter end portion. The webs between the bore 74 and the three longitudinally extending recesses 62 are cut away to leave three outwardly extending prongs 76. Thus, the reduced diameter end portion has three longitudinally extending flow passages which cannot provide any impediment to flow through the center bore 28.

Because of the arrangement of the readily separable body halves or portions 12 and 14, and the simple seal arrangement provided by the seat member 36, the valve can be rapidly disassembled and repaired. Additionally, because of the relationship between the ball and the retainer, the valve is particularly sensitive and will react extremely rapidly to change in pressures within the line.

The invention has been described in great detail sufficiently to enable one of ordinary skill in the valve art to make and use the same. Obviously, modifications and alterations of the preferred embodiment will occur upon a reading and understanding of the specification and it is our intention to include all such modifications and alterations as part of our invention insofar as they come within the scope of the appended claims.

What is claimed is:

1. A ball check valve including axially bored telescoping and threadedly engaged body portions which define a through flow path and a cylindrical internal valve chamber;

an annular ball seat component positioned between opposed inner ends of the body portions, said ball seat component having end faces sealingly engaged by shoulders formed in said body portions;

a ball retainer member carried within the internal valve chamber and having a first end facing said seat and a first cylindrical body portion closely and slidably received in said valve chamber with a second body portion which extends downstream in said bore and is of a diameter less than the diameter of said first body portion, a cylindrical opening formed axially into said second portion from its downstream end;

coil spring means positioned about said second portion and acting between a shoulder formed in said bore and a shoulder formed at the juncture between the first and second portions of said retainer for continuously biasing said retainer toward said seat;

a ball valve member positioned between the first end of the retainer and the seat with said retainer having a generally conical, axially extending recess in its first end which engages the ball valve member with line contact;

longitudinal grooves formed in said retainer and extending from said conical recess the entire length of said first and second body portions to allow flow along said retainer when said ball is forced away from the seat and to reduce contact between said ball and said retainer to short arcuate lines;

said second body provided with inwardly extending slots aligned with said grooves to provide longitudinally extending flow passages; and, said coil spring means having a fully compressed length substantially less than the length of said reduced diameter end portion.

* * * * *